United States Patent [19]

Morini et al.

[11] Patent Number: 5,278,210
[45] Date of Patent: Jan. 11, 1994

[54] PROCESS FOR THE PREPARATION OF STABILIZED POLYOLEFINS AND PRODUCTS OBTAINED THEREFROM

[75] Inventors: Giampiero Morini, Pavia; Enrico Albizzati, Novara; Dario Conti, Milan; Giulio Balbontin, Ferrara, all of Italy

[73] Assignee: HIMONT Incorporated, Wilmington, Del.

[21] Appl. No.: 988,646

[22] Filed: Dec. 10, 1992

[30] Foreign Application Priority Data

Dec. 13, 1991 [IT] Italy ................... A 003346

[51] Int. Cl.$^5$ ............... C08K 5/13; C08F 2/44
[52] U.S. Cl. ............... 524/100; 524/102; 524/104; 524/291; 524/351; 524/353; 526/125
[58] Field of Search ......... 526/125; 524/291, 100, 524/102, 104, 353, 351

[56] References Cited

U.S. PATENT DOCUMENTS

| | | | |
|---|---|---|---|
| 3,477,991 | 11/1991 | Patton et al. | 526/313 |
| 4,469,648 | 9/1984 | Ferraris et al. | 264/9 |
| 4,686,200 | 8/1987 | Terano et al. | 526/125 |
| 4,879,141 | 11/1989 | Chatterjee | 524/291 |
| 4,886,770 | 12/1989 | Cuffiani et al. | 526/125 |
| 4,960,593 | 10/1990 | Sevini et al. | 524/100 |
| 4,971,937 | 11/1990 | Albizzati et al. | 526/125 |
| 5,045,577 | 9/1991 | Mulhaupt et al. | 524/100 |
| 5,064,878 | 11/1991 | Chatterjee | 526/125 |
| 5,106,807 | 4/1992 | Morini et al. | 526/125 |
| 5,177,043 | 1/1993 | Koyama et al. | 526/125 |

FOREIGN PATENT DOCUMENTS

| | | |
|---|---|---|
| 254348 | 1/1988 | European Pat. Off. |
| 350444 | 1/1990 | European Pat. Off. |
| 351360 | 1/1990 | European Pat. Off. |
| 361494 | 4/1990 | European Pat. Off. |

*Primary Examiner*—Veronica P. Hoke

[57] ABSTRACT

Polyolefins stabilized against oxidation phenomena are obtained by using a process comprising the polymerization of monomers by way of a catalyst prepared by reacting an aluminum alkyl compound, and optionally an electron donor compound, with a solid component comprising a Ti compound and an electron-donor compound supported on magnesium chloride, the polymerization being carried out in the presence of one or more phenolic stabilizers and using, as electron-donor compound in the solid catalyst component, a compound selected from particular classes of ethers.

8 Claims, No Drawings

PROCESS FOR THE PREPARATION OF STABILIZED POLYOLEFINS AND PRODUCTS OBTAINED THEREFROM

FIELD OF THE INVENTION

Processes for the stabilization of polyolefins in polymerization and products obtained therefrom.

BACKGROUND OF THE INVENTION

A very widely used method in the art for the stabilization of olefin polymers consists of mixing the polymers with the stabilizers and extruding the mixtures thus obtained. In this manner one obtains pellets in which the stabilizers are dispersed relatively homogeneously, providing a good stability to the pellets which in turn can be transformed directly into finished products.

The above mentioned techniques for pelletizing by way of extrusion are particularly advantageous in the case of polymers obtained in the form of irregular particles and with low flowability, which consequently must be granulated in order to obtain a commercial product. Ziegler-Natta catalysts supported on magnesium chloride, and polymerization processes based on the use of such catalysts, are establishing themselves in the field of olefin polymerization. Such catalysts are capable of producing polymer particles that because of their high flowability, high bulk density, and absence of extremely fine particles, can be commercialized directly, without having to be transformed into extruded granules. There is a definite need, therefore, for a process that allows one to stabilize the above mentioned particles directly, without requiring subsequent extrusion. It is of particular interest to obtain a stabilizing effect against oxidating phenomena which occur during polymer storage.

One of the solutions proposed in the known art to reach the above mentioned objective consists of adding one or more stabilizers during the polymerization process. This solution is particularly interesting because it would mean that no treatment of any kind would be needed downstream from the polymerization plant. According to U.S. Pat. No. 3,477,991, in order to obtain a stabilized polymer, alkenylphenols are added in an α-olefins polymerization process carried out with a $TiCl_3$ based catalyst. However, as shown in published European patent application EP-A-0192987, adding phenol compounds to Ziegler-Natta catalysts supported on magnesium chloride causes unacceptable decreases in stereospecificity, or a yellowing of the polymer. In order to overcome those limitations, the European patent application suggests the addition of HALS (hindered amine light stabilizers) during the polymerization phase. In this manner one can obtain a stabilizing effect against thermal oxidation.

According to published European patent application EP-A-0254 348, one can obtain good polyolefin stabilization, particularly against degradation phenomena which occur during the handling of polyolefins in the molten state by adding phosphites and phosphonites during polymerization. Moreover according to published European patent applications 350444 and 351360, various combinations of HALS, phosphorous esters, and phenols are also added during polymerization in order to obtain a stabilizing effect against thermal oxidation.

The above mentioned documents show that the addition of HALS and phosphorus esters does not interfere much with the activity of the Ziegler-Natta catalysts supported on magnesium chloride, and allows one to obtain polymers with no yellowing effects.

Moreover, the above mentioned published European patent application 351 360 shows that, thanks to the addition of the phosphorus compound, one can also add moderate quantities of phenolic stabilizers without yellowing of the polymer.

However, it must be pointed out that all the above mentioned solutions do not solve the problem of eliminating the damaging effects caused by the addition of phenolic stabilizers in a polymerization carried out with supported catalysts, but require the use of other stabilizers, partially or totally substituting the phenolic stabilizers.

On the other hand, it is well known that in practice, the phenolic stabilizers are the only stabilizers capable of conferring to the polyolefins a high resistance to thermal oxidation phenomena, and to oxidation and discoloration phenomena which occur during the storing of the polymer.

Moreover, by adding to the polyolefins HALS (typical stabilizers against light induced oxidation), phosphorus esters (typical process stabilizers used to avoid polymer degradation during its handling in the molten state), and phenolic stabilizers, one limits the final use of the polyolefins, since the user does not have the possibility of choosing a stabilizing formulation aimed at a specific end-use both in qualitative and quantitative terms.

SUMMARY OF THE INVENTION

A process for the preparation of stabilized polyolefins comprising the polymerization of at least one olefin monomer by means of a catalyst prepared by reacting an aluminum alkyl compound, and optionally an electron-donor compound, with a solid compound comprising a Ti compound having at least one Ti-halogen bond and an electron-donor compound supported on magnesium chloride, the polymerization being conducted in the presence of one or more phenolic stabilizers, and using, as the electron-donor compound in the solid catalyst component, a compound selected from ethers which contain two or more ether functions and that, under standard conditions, are complexed with anhydrous magnesium chloride to the extent of less than 60 mmoles per 100 g of chloride and do not generate substitution reactions with $TiCl_4$, or react in this manner only to the extent of less than 50% in moles.

DETAILED DESCRIPTION

Now it has surprisingly been found that, based on the selection of certain specific supported catalyst systems, it is possible to obtain polyolefins which are stabilized against oxidating phenomena by way of adding phenolic stabilizers during polymerization, eliminating the above mentioned inconveniences concerning decreased catalyst performances and yellowing of the polymer.

With use of the above mentioned catalyst systems comprising, as electron-donor compound supported on the solid catalyst component, a compound selected from the above defined ethers, one can obtain polyolefins with very high levels of stabilization against oxidating phenomena, and in particular against thermal oxidation (especially as a result of storage conditions) avoiding, as previously stated, inconveniences derived from the use of conventional supported catalyst systems, where, in order to obtain high stereospecificity, the electron-donor supported on the solid catalyst component is typically selected from the esters of carboxylic acids. The catalyst systems used in the process of the present invention are described in published European patent application 361,494, which is incorporated herein by reference.

In the catalyst systems at the present invention the aluminum alkyl compound is preferably a trialkyl compound, such as for example Al-triethyl, Al-triisobutyl, or Al-tri-n-butyl. Also used are linear or cyclic Al-alkyl compounds containing two or more Al atoms bonded to each other by way of O, N, or S atoms.

Examples of such aluminum compounds are:

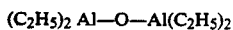

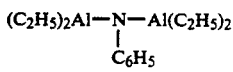

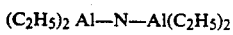

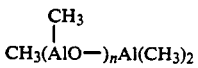

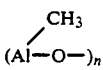

where n is a number from 1 to 20.

The aluminum alkyl compound is used in Al to Ti ratios generally ranging from 1 to 1000.

Optionally one can use, together with the aluminum alkyl compound, an electron-donor compound preferably selected from silicon compounds containing at least one Si—OR bond (R=hydrocaron radical), 2,2,6,6-tetramethylpiperidine, and 2,6-diisopropylpiperidine.

Preferably the silicon compounds have the formula

where $R^I$ and $R^{II}$, equal or different, are branched alkyl radicals, cycloaliphatic or aryl radicals with 1-12 carbon atoms; $R^{III}$ and $R^{IV}$, equal or different, are alkyl radicals with 1-6 carbon atoms Examples of these compounds are:

(tert-butyl)$_2$ Si(OCH$_3$)$_2$; (cyclohexyl)$_2$ Si(OCH$_3$)$_2$; (isopropyl)$_2$ Si(OCH$_3$)$_2$; (sec-butyl)$_2$ Si(OCH$_3$)$_2$.

The molar ratio between the Al-alkyl compound and the above mentioned electron-donor compounds generally ranges from 5:1 to 100:1. However, in the process of the present invention the use of catalyst systems without the above mentioned electron-donors is preferred.

The solid catalyst component, comprising the titanium compound having at least one Ti-halide bond and the ether supported on magnesium chloride, is prepared according to known techniques. Particularly those techniques that allow one to obtain magnesium chloride in active form are used. The active form of the magnesium chloride present in the catalyst component used in the process of the present invention can be recognized by the fact that in the X-ray spectrum of the catalyst component, the major intensity reflection, which appears at the interplanar distance of 2.56 Å in the nonactivated magnesium chloride spectrum (having a surface area smaller than 3 m$^2$/g), is no longer present, but in its place there is a halo with the maximum intensity shifted with respect to the position of the major intensity reflection, or by the fact that the major intensity reflection shows a width at half-height at least 30% greater than the one of the corresponding nonactivated Mg chloride reflection. The most active forms are those where the above mentioned halo appears in the X-ray spectrum of the catalyst component.

For example, in order to obtain catalyst compoments containing Mg chloride in the above mentioned forms, the Mg chloride (anhydrous, i.e., containing less than 1% water), the titanium compound, and the di- or polyether, are milled together under conditions which cause the Mg chloride to be activated. After milling the product is treated one or more times with an excess of TiCl$_4$, at temperatures ranging from 80° to 135° C., and then washed repeatedly with a hydrocarbon (hexane, for example) until all chlorine ions disappear.

According to another method, the anhydrous Mg chloride is preactivated according to known methods, and then reacted with an excess of TiCl$_4$ containing the ether compound in solution. In this case too the operation is carried out at temperatures ranging from 80° to 135° C. Optionally, the treatment with TiCl$_4$ is repeated, and the solid is then washed with hexane to eliminate all traces of nonreacted TiCl$_4$.

Following yet another method, a MgCl$_2$.nROH adduct (particularly in the form of spheroidal particles), where n generally ranges from 1 to 3, and ROH is ethanol, butanol, or isobutanol, is caused to react with an excess of TiCl$_4$ containing the ether in solution. The temperature generally ranges from 80° to 120° C. After the reaction, the solid is caused to react once more with TiCl$_4$, then separated and washed with a hydrocarbon until all chlorine ions disappear. It is also possible to support the Mg chloride on porous supports, such as silica, alumina, and styrene resins. The styrene resins and their use as supports are described in published European patent application n. 283011.

Generally, the titanium compound that can be used in the preparation of the solid catalyst component is selected from the Ti-halides and halogen alcoholates. Titanium tetrachloride is the preferred compound. The Mg/Ti ratio in the above catalyst components generally ranges from 30:1 to 4:1; in the component supported on resins the ratio can be lower, and generally ranges from 20:1 to 2:1.

The MgCl$_2$/ether compound molar ratio used in the reactions when preparing the catalyst component ranges generally from 4:1 to 12:1. The ether compound is fixed on the magnesium chloride in molar quantities generally ranging from 5 to 20%.

However, in the case of compound supported on styrene resins, the molar ratio between the fixed ether compound and the magnesium present generally ranges from 0.3 to 0.8.

The ethers that can be used in the preparation of the solid catalyst components answer to the reaction creteria defined above, and are amply described in the above mentioned published European patent application 361494.

The tests that allow the verification of said reaction criteria are described below.

Test for Complexing the Ethers with MgCl$_2$

In a 100 ml glass flask equipped with mechanical fixed-blade agitator are sequentially introduced in a nitrogen atmosphere:

70 ml of anhydrous n-heptane
12 mmoles of anhydrous MgCl$_2$ activated as described below
2 mmoles of ether.

The content is allowed to react at 60° C. for 4 hours (agitation speed 400 rpm). Then it is filtered and washed at ambient temperature with 100 ml of n-heptane after which it is dried by means of a mechanical pump. The solid is characterized after a treatment with 100 ml of ethanol by way of gas chromatographic quantitative analysis in order to determine the quantity of ether that was fixed.

TiCl$_4$ Reaction Test

In a 25 ml test-tube equipped with a magnetic agitator are sequentially introduced in nitrogen atmosphere:
10 ml of anhydrous n-heptane
5 mmoles of TiCl$_4$
1 mmoles of electron-donor.

The content is allowed to react at 70° C. for 30 minutes after which it is cooled to 25° C. and decomposed with 90 ml of ethanol.

The solutions obtained are analyzed by way of gas chromatography, using the internal standard method, with a Carlo Erba HRGC 5300 Mega Series gas chromatograph equipped with a 25 meters Chrompack CP-SIL 5 CB capillary column.

The magnesium chloride used in the complexing test with the ethers is prepared as follows:

In the jar of a vibrating mill (Siebtechnik Vibratom) having a 1 liter capacity, containing 1 8 Kg of steel spheres with a 16 mm diameter, are introduced in nitrogen atmosphere 50 g of anhydrous MgCl$_2$ and 6.8 ml of 1,2-dichloroethane (DCE). The content is milled at ambient temperature for 96 hours, after which the solid recovered is kept in a vacuum at the mechanical pump for 16 hours at 50° C.

Characterization of the Solid
width at half-height of reflection D110=1.15 cm.
presence of a halo with maximum intensity at 2=32.1°
surface area (B.E.T.)=125 m$^2$/g
DCE residue=2.5% by weight.

Examples of ethers with the prerequisites indicated above are 1,3-diethers of the formula:

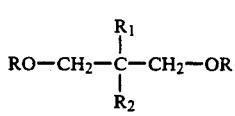

where R, R$_1$ and R$_2$, equal or different, are linear or branched alkyl, cycloalkyl, aryl, alkaryl, or aralkyl radicals with 1-18 carbon atoms, and R$_1$ and R$_2$ can also be a hydrogen atom.

In particular, R is an alkyl radical with 1-6 carbon atoms, and more particularly it is a methyl; moreover, when R$_2$ is methyl, ethyl, propyl, or isopropyl, R$_2$ can be ethyl, propyl, isopropyl, butyl, isobutyl, tert-butyl, 2-ethylhexyl, cyclopentyl, cyclohexyl, methylcyclohexyl, phenyl, or benzyl; when R$_1$ is hydrogen, R$_2$ can be ethyl, butyl, sec.butyl, tert-butyl, 2-ethylhexyl, cyclohexylethyl, diphenylmethyl, p-chlorophenyl, 1-naphthyl, 1-decahydronaphthyl; R$_1$ and R$_2$ can also be equal, and be ethyl, propyl, isopropyl, butyl, isobutyl, tert-butyl, neopentyl, phenyl, benzyl, cyclohexyl, and cyclopentyl.

Specific examples of ethers which can be used advantageously are: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl) 1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane,2(p-fluorophenyl)-1,3-dimethoxypropane, 2(1-decahydronaphthyl)-1,3-dimethoxypropane, 2(p-t-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-di(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-di-sec-butyl-1,3-dimethoxypropane, 2,2-di-tert-butyl-1,3-dimethoxypropane, 2,2-dineopentyl-1,3-dimethoxypropane, 2-isopropyl-2-isopentyl-1,3-dimethoxypropane, 2-phenyl-2-benzyl-1,3-dimethoxypropane, 2-cyclohexyl-2-cyclohexylmethyl-1,3-dimethoxypropane.

Other ethers that can be used are: 2,3-diphenyl-1,4-diethoxybutane, 2,3-dicyclohexyl-1,4-diethoxybutane, 2,3-dibenzyl-1,4-diethoxybutane, 2,3-dibenzyl-1,4-dimethoxybutane, 2,3-dicyclohexyl-1,4-dimethoxybutane, 2,3-diisopropyl-1,4-dimethoxybutane, 2,3-diisopropyl-1,4-diethoxybutane, 2,2-bis(p-methylphenyl)-1,4-dimethoxybutane, 2,3-bis(p-chlorophenyl)-1,4-dimethoxybutane, 2,3-bis(p-fluorophenyl)-1,4-dimethoxybutane, 2,4-diphenyl-1,5-dimethoxypentane, 2,5-diphenyl-1,5-dimethoxypentane, 2,4-diisopropyl-1,5-dimethoxypentane, 3-methoxymethyltetrahydrofuran, 3-methoxymethyldioxane, 1,1-dimethoxymethyl-1,2,3,4-tetrahydronaphthalene, 1,1-dimethoxymethyl-decahydronaphthalene, 1,1-dimethoxymethylindan, 2,2-dimethoxymethylindan, 1,2-dimethoxymethyl-2-isopropyl-5-methylcyclohexane, 1,3-diisobutoxypropane, 1,2-diisobutoxyethane, 1,3-diisoamyloxypropane, 1,2-diisoamyloxyethane, 1,3-dineopentoxypropane, 1,2-dineopentoxyethane, 2,2-tetramethylene-1,3-dimethoxypropane, 2,2-pentamethylene-1,3-dimethoxypropane, 2,2-hexamethylene-1,3-dimethoxypropane, 1,2-bis (methoxymethyl)cyclohexane, 2,8-dioxaspyro[5,5]undecane, 3,7-dioxabicyclo[3,3,1]nonane, 3,7-dioxabicyclo[3,3,0]octane, 3,3-diisobutyl-1,5-dioxonane, 6,6-diisobutyldioxepane, 1,1-dimethoxymethylcyclopropane, 1,1-bis[methoxymethyl]cyclohexane, 1,1-bis[methoxymethyl]bicyclo[2,2,1]heptane, 1,1-dimethoxymethylcyclopentane, 2-methyl-2-methoxymethyl-1,3-dimethoxypropane.

Particularly preferred ethers are the 1,3-diethers pertaining to the general formula mentioned above, and in particular those where R is methyl and $R_1$ and $R_2$, equal or different, are isopropyl, isobutyl, tert-butyl, cyclohexyl, isopentyl, cyclohexylethyl. Particularly preferred ethers are 2,2-diisobutyl-1,3-dimethoxypropane; 2-isopropyl-2-isopentyl-1,3-dimethoxypropane; 2,2-bis(cyclohexylmethyl)-1,3-dimethoxypropane.

By using the catalyst systems described above, with the process of the present invention one can stabilize polymers and copolymers of α-olefins of formula $CH_2=CHR$, where R is hydrogen or a $C_{1-6}$ alkyl or an aryl radical, particularly phenyl, optionally containing diolefin comonomers, such as butadiene, 1,4=hexadiene, ethylidenenorbornene, 1,5-hexadiene, and dicyclopentadiene. For this purpose, as previously stated, it is sufficient to carry out the polymerization in the presence of one or more phenolic stabilizers.

In particular, the process of the present invention allows one to obtain very interesting results in the stabilization of crystalline homopolymers and copolymers of propylene and ethylene.

The polymerization of the olefins is carried out, according to known methods, in liquid phase comprising the monomer, or a solution of the monomer or monomers in aliphatic or aromatic hydrocarbon solvent, or in gas phase, or even by combining liquid and gas phases.

The polymerization or copolymerization temperature generally ranges from 0° to 150° C.; in particular from 60° and 100° C. The operation takes place at atmospheric pressure or higher.

The phenolic stabilizers can be introduced in the polymerization before or during the reaction.

In the case of batch polymerization, the phenolic stabilizers can be introduced in the reactor before the catalyst component or together with it, or later during the polymerization reaction.

In continuous polymerization, the phenolic stabilizers can be introduced in the reactor together with the catalyst, or separately. If a series of reactors are used, they can be introduced in any of them. They can also be added at the end of the polymerization reaction before the catalyst is quenched.

In general, the phenolic stabilizers can be added pure or in solution in proper solvents, such as aliphatic or aromatic hydrocarbons, for example hexane, heptane, cyclohexane and toluene, or alcohols like methanol, ethanol, and isopropane, or ketones such as acetone. One can use liquid olefin monomers as solvents.

The phenolic stabilizers which can be used in the process of the present invention are generally all the stabilizers known in the art as phenolic antioxidants. Such phenolic antioxidants are generally characterized by the presence, in their structure, of one or more stearically hindered phenolic groups, i.e., groups having at least one substituent which is not hydrogen, preferably a $C_{3-30}$ branched alkyl radical, in the ortho position with respect to the hydroxyl group.

Examples of the above compounds are the phenol compounds of formula:

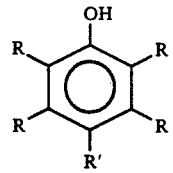

where R' is a $—CHR_2$ or $—OR$ radical; the R radicals, both in formula (I) and in R', equal or different, are hydrogen, or $C_{1-30}$ linear or branched alkyl radicals; $C_{3-30}$ cycloalkyl; $C_{6-30}$ aryl, $C_{7-30}$ alkaryl or aralkyl; or $C_{1-30}$ alcoxyl radicals; one or more of said R radicals can optionally contain functional groups, particularly piperidine or $—COOR''$; $—O—$; $—S—$; $—NHR''$; $—NHR''—NHR''$; $—OR''$ groups, where R'' is selected from hydrogen, or $C_{1-30}$ linear or branched alkyl; $C_{3-30}$ cycloalkyl; $C_{6-30}$ aryl, $C_{7-30}$ alkaryl or aralkyl; or two or more of the R and R' radicals are bonded to form cyclic structures; as long as at least one of the two R radicals in the ortho position with respect to the $—OH$ group in formula (I) is not hydrogen; or the phenolic stabilizers comprising two or more structural units of forula (I) where the R and R' radicals have the above mentioned meaning, with the difference that at least one of them is substituted by a direct bond or a $—O—$ or $—S—$ functional group, or a polyvalent linear or branched $C_{1-30}$ alkyl; $C_{3-30}$ cycloalkyl; $C_{6-30}$ aryl; $C_{7-30}$ alkaryl or aralkyl radical, said polyvalent radicals optionally containing the above mentioned functional groups, and where all the valences are saturated by structural units of formula (I).

Specific example of the above mentioned phenolic antioxydants are: 2,6-di-tert-butyl-4-methylphenol; 2-tert-butyl-4,6-dimethylphenol; 2,6-di-tert-butyl-4-ethylphenol; 2,6-di-tert-butyl-4-isoamylphenol; 2,6-dicyclopentyl-4-methylphenol; 2-tert-butyl-4,6-diisopropylphenol; 2-tert-butyl-4,6-dioctadecylphenol; 2,6-di-tert-butyl-4-methoxymethylphenol; 2,5-di-tert-butylhydroquinone; 2,6-dicyclohexylhydroquinone; 2,6-di-tert-butyl-4-hexadecyloxyphenol; 4,4'-thiobis(6-tert-butyl-2-methylphenol); 2,2'-methylene-bis(6-tert-butyl-4-methylphenol); 4,4'-methylene-bis(2,6-di-tert-butylphenol); 1,1-bis(5-tert-butyl-4-hydroxy-2-methylphenyl)butane; 3(3,5-di-tert-butyl-4-hydroxyphenyl)propionate of octadecylmethyl; 3(3,5-dicyclohexyl-4-hydroxyphenyl)propionate of ethyl or octadecyl; 1,3,5-trimethyl-2,4,6-tris(3',5'-ditert-butyl-4-hydroxybenzyl)benzene; tetrakis[methylene(3,5-di-tert-butyl-4-hydroxyhydrocinnamate)]methane; 2,2-bis[4-(2(3,5-di-tert-butyl-4-hydroxycinnamoyloxy)ethoxyphenyl]propane; pentaerythritol-tetrakis[3-(3,5-di-tert-butyl-4-hydroxyphenyl)propionate.

The quantities of phenolic stabilizers that can be used in the process of the present invention are generally the ones used to stabilize olefins with traditional techniques, such as extrusion, for example. Smaller quantities with respect to the ones typically utilized in traditional techniques can also be used, since with the process of the present invention one obtains an optimal dispersion of the stabilizer in the polymer, and consequently the effectiveness of the stabilizer is increased.

Preferably, the phenolic stabilizers are added in quantities ranging from 0.01 to 0.6 g, more preferably from 0.05 to 0.3 g, for 100 g of polymer produced in polymerization.

With the process of the present invention it is also possible to introduce, besides phenolic stabilizers, other stabilizers whose effectiveness is well known in the art of stabilization in polymerization, such as HALS, organic phosphites and phosphonites, and phosphorous organic amides. In this case, the process of the present invention has the advantage, with respect to the processes which use traditional supported catalysts, of having minor interferances to the catalyst system from all the stabilizers, as it will be shown in the examples. The HALS which can be used in addition to the phenolic stabilizers according to the present invention are monomeric or oligomeric compounds containing in the molecule one or more substituted piperidinic groups having the following general formula

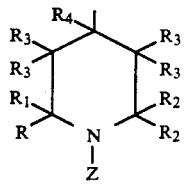 (II)

where the $R_1$ radicals, equal or different, are $C_{1-4}$ alkyl radicals, or tetramethylpiperidine radicals, or the alkyl radicals form, with the piperidine carbon atoms to which they are bonded, a $C_5$-$C_9$ cycloalkyl radical; the $R_2$ radicals, equal or different, are hydrogen or $C_1$-$C_{18}$ alkyl radicals, $C_7$-$C_{18}$ arylalkyl radical, or the alkyl radicals form, with the piperidine carbon atoms to which they are bonded, a $C_5$-$C_{10}$ cycloalkyl radical; the $R_3$ radicals, equal or different, are hydrogen, or $C_1$-$C_{18}$ alkyl radicals or $C_7$-$C_{18}$ aralkyl radicals; the $R_4$ radical is hydrogen, or a $C_1$-$C_8$ radical, or a benzyl radical; Z is hydrogen, or a $C_1$-$C_{18}$ alkyl, $C_1$C$_{-12}$ alkylene, $C_3$-$C_{12}$ alkene, $C_3$-$C_5$ alkyne, $C_7$-$C_{18}$ aralkyl, $C_2$-$C_4$ acyl, $C_2$-$C_{18}$ alkanoyl, $C_3$-$C_{18}$ alkoxyalkyl, $C_3$-$C_{18}$ alkenoyl, oxyl, cianomethyl, xylylene radical, or a radical having valences ranging from 1 to 4, and containing from 1 to 4 hydroxyl groups, and optionally ether, ester, or heterocyclic groups, said radical having the valences bonded to the nitrogen of piperidine groups, or a bivalent radical containing one or more ester or amide groups, or a

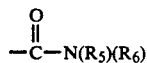

radical, wherein $R_5$ and $R_6$ are hydrocarbon radicals.

Preferably Z is a $C_1$-$C_{12}$ alkyl radical, or a $C_3$-$C_8$ alkene, $C_7$-$C_{11}$ aralkyl radical, or a bivalent radical containing one or more ester groups, said radical having the valences bonded to the nitrogen of piperidine groups.

Specific examples of preferred HALS according to the present invention are the compounds having the following formulas:

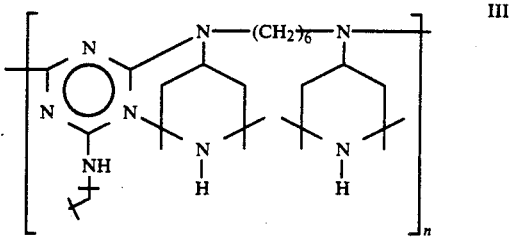 III wherein n varies generally from 2 to 20. A compound of this type is marketed by CIBA-GEIGY under the trademark of Chimassorb 944.

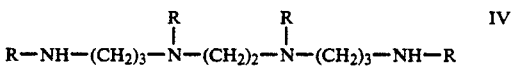 IV marketed by CIBA-GEIGY under the trademark of Chimassorb 905 where R is:

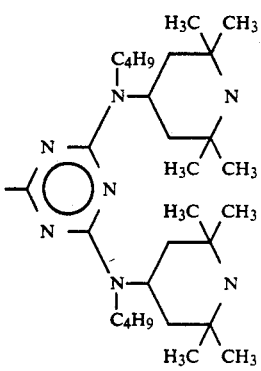

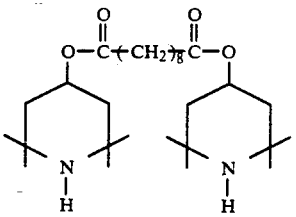 V marketed by CIBA-GEIGY under the trademark of Tinuvin 770.

Examples of organic phosphites that can be used as stabilizers for the polyolefins in addition to the phenolic stabilizers according to the present invention, are the compounds having the following general formulas:

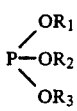 VI where $R_1$, $R_2$, $R_3$, equal or different, are alkyl, aryl, or arlakyl radicals having 1 to 18 carbon atoms;

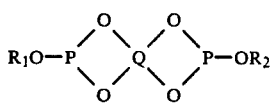 VII where $R_1$ and $R_2$, equal or different, are radicals having the meaning indicated above;
Q is a tetravalent alkyl radical;

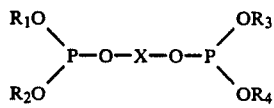 VIII where $R_1$, $R_2$, $R_3$, $R_4$, equal or different, are radicals having the meaning already indicated for the R radicals, X is a bivalent alkyl, aryl, or aralkyl radical.

Examples of organic phosphites comprised in general formula VI are described in U.S. Pat. Nos. 4,187,212, and 4,290,941.

Specific examples of compounds comprised in general formulas VI, VII, and VIII are: tris(2,4-di-tert-butylphenyl)phosphite marketed by CIBA-GEIGY under the trademark Irgafos 168; distearyl pentaerythritol diphosphite marketed by BORG-WARNER CHEMICAL under the trademark Weston 618; 4,4'-butylidene bis(3-methyl-6-tert-butylphenyl-di-tridecyl)-phosphite marketed by ADEKA ARGUS CHEMICAL under the trademark Mark P; tris(mononylphenyl)phosphite; bis(2,4-di-tert-butyl)pentaerithritol diphosphite, marketed by BORG-WARNER CHEMICAL under the trademark Ultranox 626.

Examples of organic phosphonites that can be used as stabilizers according to the present invention are the compounds of general formula:

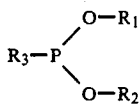 IX where $R_1$, $R_2$, $R_3$, equal or different, are alkyl, aryl, or aralkyl radicals having 1 to 18 carbon atoms.

In turn, the $R_3$ radical can be substituted with a

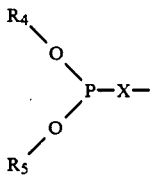 X group, where $R_4$ and $R_5$, equal or different, are radicals having the meaning indicated above for the R radicals, and X is a bivalent alkyl, aryl, or aralkyl radical.

Examples of organic phosphonites comprised in general formula IX are described in GB patent 1,372,528.

A specific example of compounds comprised in general formula IX is the tetrakis(2,4-di-tert-butylphenyl)4,4'-diphenylilenediphosphonite, marketed by Sandoz under the trademark Sandostab P-EPQ.

All the above stabilizers can be used in the process of the present invention with the same methods described above for phenolic stabilizers.

Said stabilizers are preferably added in quantities ranging from 0.01 to 0.3 g per 100 g of polymer produced in polymerization, in addition to the phanolic stabilizers, or as substitutes of an equivalent quantity of same.

As previously stated, stabilized polyolefins obtained with the process described above are also an object of the present invention. In particular, it is an object of the present invention to obtain olefin polymers of the type described above in non-extruded particle form containing, preferably as the only stabilizing agents, one or more phenolic stabilizers, and optionally one or more HALS, and having an oxidation induction time at 180° C. (measured using the methods described in the examples) higher than or equal to 20 minutes, preferably higher than or equal to 30 minutes, more preferably higher than 35 minutes, particularly ranging from 36 to 55 minutes.

In particular, the process of the present invention allows one to obtain, with excellent results, stabilized polymers having the above characteristics and comprising isotactic homopolymers of propylene having an isotactic index preferably higher than 90%, more preferably higher than 95%.

Also preferred, in terms of physical and morphological characteristics, the stabilized polymers in particle form having a bulk density ranging from 0.3 to 0.6 g/cm$^3$, determined according to ASTM 1895-69, method A, and flowability ranging from 9 to 16 seconds, measured according to ASTM 1895-69 method A.

More preferably, the above particles are in spheroidal form and have a diameter ranging from 0.5 to 4.5 mm, and at least 90% of them have a diameter ranging from 0.5 to 3.5 mm. Such polymer particles are obtained by using in polymerization supported catalyst components having a controlled morphology. Said components can be prepared using various techniques, among which is the above mentioned reaction of TiCl$_4$ with a MgCl$_2$.nROH adduct in spheroidal particle form (prepared for example with the process described in U.S. Pat. No. 4,469,648), or using polymers in spherical form as described in the above mentioned published European patent application 283,011.

The following examples are given in order to illustrate and not limit the present invention.

Polymerization of Propylene in the Presence of Stabilizers

In a 2 liter stainless steel autoclave equipped with anchor agitator, and previously purged in anhydrous nitrogen flow at 70° C. for 1 hour, are introduced, in propylene flow at ambient temperature, 20 ml of anhydrous n-heptane containing the proper quantity of solid catalyst component and 5 mmoles of AlEt$_3$ (Et=ethyl).

The autoclave is closed, and 600 ml of hydrogen are introduced. The agitator is put in motion, and 600 g of liquid propylene are fed. The temperature is brought to 70° C. in 10 minutes, and after 10 minutes of polymerization at this temperature, one introduces in the autoclave the stabilizers dessolved in 50 ml of anhydrous n-heptane.

The content is polymerized at 70° C. for a total of 2 hours, then the nonreacted propylene is removed, the polymer recovered is treated with steam at 100° C. for 10 minutes and then dried in an oven at 70° C. in nitrogen flow for 3 hours.

Characterization of the Polymer

The following methods are used in order to characterize the polymer:

Isotactic index (I.I.) by way of extraction in boiling n-heptane

Oxidation induction time at 180° C. (Ox.I.T.180° C.) [D. D. Marshall et al, Polym. Eng. and Sci., 13 (6), 415 (1973)].

EXAMPLE 1

Preparation of the Solid Catalyst Component

In a 500 ml reactor equipped with porous barrier are introduced at 0° C. 225 ml of TiCl$_4$. While stirring, one adds, in 15 minutes, 10.1 g (54 mmoles) of microspheroidal MgCl$_2$.2C$_2$H$_5$OH obtained with the methods described below. Once the addition is completed the temperature is brought to 40° C., and 9 mmoles of 2-isopentyl-2-isopropyl-1,3-dimethoxypropane are introduced. The temperature is brought to 100° C. in 1 hour; the content is allowed to react for 2 hours, and then the TiCl$_4$ is removed by filtration, at which time an additional 200 ml of TiCl$_4$ are added and the content is allowed to react at 120° C. for 1 hour, then filtered and washed at 60° C. with n-heptane until all the chlorine ions in the filtrate have disappeared.

The catalyst component thus obtained contains 2.5% by weight of Ti, and 14.8% by weight of diether.

The microspheroidal MgCl$_2$.2C$_2$H$_5$OH adduct is prepared as follows.

48 g of anhydrous MgCl$_2$, 77 g of anhydrous C$_2$H$_5$OH, and 830 ml of kerosene are introduced, in inert gas and at ambient temperature, in a 2 liter autoclave equipped with turboagitator and dip-pipe. The content is heated to 120° C. while stirring, thus forming the adduct between MgCl$_2$ and the alcohol which melts the disperser and remains mixed with it. The nitrogen pressure inside the autoclave is maintained at 15 atm. The dip-pipe is heated externally to 120° C. with a heating jacket, has an inside diameter of 1 mm, and has a length of 3 meters from one extremity of the heating jacket to the other.

The mixture is then made to flow through the pipe at a velocity of about 7 m/sec.

At the output of the pipe the dispersion is collected in a 5 liter flask under agitation, said flask containing 2.5 liter of kerosene, cooled externally by a jacket mainained at the initial temperature of −40° C. The final temperature of the emulsion is 0° C.

The spherical solid product that constitutes the emulsion dispersed phase is separated by settling and filtering, after which it is washed with heptane and dried.

All these operations take place in an inert gas atmosphere.

One obtains 130 g of MgCl$_2$.3C$_2$H$_5$OH in the form of solid spherical particles having a maximum diameter of less than 50 μm. The solid product, dried under vacuum for 2 hours, weighs 105 g. This solid product is gradually heated up to 180° C. under nitrogen stream, thus obtaining an adduct of formula MgCl$_2$.2C$_2$H$_5$OH.

Polymerization

The propylene is polymerized as described in the general process using 6 mg of solid catalyst component and introducing 0.24 g of Irganox 1010 (phanolic compound produced by Ciba-Geigy and having the formula pentaerythrityl-tetrakis[3-(3,5-di-tert-butyl-4-hydroxyphenyl)propionate) as stabilizer.

283 g of white polymer are obtained, said polymer having an yield of 47.1 kg of polymer/g of catalyst, with an I.I.=97.2%, and Ox.I.T. at 180° C.=39 minutes.

When the same polymerization is carried out without adding any stabilizer, one obtains 298 g of polymer (yield=49.7 kg of polymer/g of catalyst) having an I.I.=97.1%, and an Ox.I.T. at 180° C.=0 minutes.

COMPARATIVE EXAMPLE 1

The solid catalyst is prepared as described in Example 1, but using the di-isobutyl phthalate as the electron-donor compound instead of the 2-isopentyl-2-isopropyl-1,3-dimethoxypropane.

The propylene is polymerized as described in the general process with the difference that one introduces 9 mg of solid catalyst component, 5 mmoles of AlEt$_3$, and 0.25 mmoles of diphenyl-dimethoxysilane as external donor, and 0.24 g of Irganox 1010 as stabilizer.

280 g of polymer are obtained with an yield of 30.8 Kg of polymer/g of catalyst having an I.I.=80.2%.

When the same polymerization is carried out without adding any stabilizer during the test, one obtains respectively an yield of 41 Kg of polymer/g of catalyst and an I.I.=96%.

COMPARATIVE EXAMPLE 2

The operation occurs as in comparative example 1, but using 2-isopentyl-2-isopropyl-1,3-dimethoxypropane as the external donor instead of diphenyl-dimethoxysilane.

73 g of polymer are obtained with an yield of 8.1 Kg of polymer/g of catalyst having an I.I.=89.3%.

When the same polymerization is carried out without adding any stabilizer during the test, one obtains respectively an yield of 40 Kg of polymer/g of catalyst and an I.I.=98%.

EXAMPLE 2

One operates as in Example 1, using the same quantity and type of solid catalyst component, but introducing a blend of stabilizers comprising 0.24 g of Irgafos 168, 0.12 g of Irganox 1010, and 0.24 g of Chimasorb 944.

275 g of white polymers are obtained with an yield of 45.8 Kg of polymer/g of catalyst having an I.I.=96.9%, and an ox.I.T. at 180° C.=52 minutes.

EXAMPLE 3

One operates as in Example 1, but using in the synthesis of the solid catalyst component the 2,2-di-isobutyl-1,3-dimethoxypropane as the electron donor compound.

The propylene is polymerized as described in the general process using 6 mg of solid catalyst component, and introducing 0.24 g of Irganox 1010 as stabilizer.

325 g of white polymers are obtained with an yield of 54.2 Kg of polymer/g of catalyst having an I.I.=95.3%, and an Ox.I.T. at 180° C.=36 minutes.

When the same polymerization is carried out without adding any stabilizer, one obtains 330 g of polymer (with an yield of 55.1 Kg of polymer/g of catalyst) having an I.I.=95.4%.

EXAMPLE 4

One operates as described in Example 1, but using in the synthesis of the solid catalyst component the 2,2-dicyclopentyl-1,3-dimethoxypropane as the electron donor compound.

The propylene is polymerized as described in the general process using 6 mg of solid catalyst component, and introducing 0.24 g of Irganox 1010 as stabilizer.

300 g of white polymers are obtained with an yield of 50 Kg of polymer/g of catalyst having an I.I.=96.3%, and an Ox.I.T. at 180° C.=37 minutes.

When the same polymerization is carried out without adding any stabilizer, one obtains 302 g of polymer (with an yield of 50.4 Kg of polymer/g of catalyst) having an I.I.=96.3%.

EXAMPLE 5

One operates as described in Example 1, but introducing a blend of stabilizers comprising 0.24 g of Irganox 1010, and 0.12 g of Irganox 1076.

254 g of white polymers are obtained with an yield of 42.3 Kg of polymer/g of catalyst having an I.I.=97.09%, and an Ox.I.T. at 180° C.=48 minutes.

COMPARATIVE EXAMPLE 3

One operates as in Example 2, but using the catalyst system of comparative Example 1, i.e. introducing 9 mg of solid catalyst prepared as described in comparative example 1, 5 mmoles of AlEt$_3$, and 0.25 mmoles of diphenyldimethoxysilane as external donor.

216 g of polymer are obtained with an yield of 24.0 Kg of polymer/g of catalyst, having an 1.1.=87.3%.

Other features, advantages and embodiments of the invention disclosed herein will be readily apparent to those exercising ordinary skill after reading the foregoing disclosure.

In this regard, while specific embodiments of the invention have been described in considerable detail, variations and modifications of these embodiments can be effected without departing from the spirit and scope of the invention as described and claimed.

We claim:

1. A process for the preparation of stabilized polyolefins comprising the polymerization of at least one olefin monomer by way of a catalyst prepared by reacting an aluminum alkyl compound, and optionally an electron-donor compound, with a solid component comprising a Ti compound having at least one Ti-halogen bond and an electron donor compound supported on magnesium chloride, said polymerization being conducted in the presence of one or more phenolic stabilizers, and using, as said electron-donor in said solid catalyst component, a compound selected from ethers which contain two or more ether functions and that, under standard conditions, are complexed with anhydrous magnesium chloride to the extent of less than 60 mmoles per 100 g of chloride, and that with said Ti compound they do not generate substitution reactions, or react in such a way only to the extent of less than 50% in moles.

2. The process of claim 1, where said electron-donor compound present in said catalyst component is selected from the group consisting of the 1,3-diethers of formula:

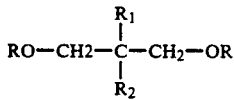

where R, R$_1$, and R$_2$, equal or different, are linear or branched alkyl, cycloaliphatic, aryl, alkaryl, or aralkyl radicals with 1-18 carbon atoms, and R$_1$ or R$_2$ can also be a hydrogen atom.

3. The process of claim 2, where said electron-donor compound is a 1,3-diether in whose formula R is an alkyl radical with 1-6 carbon atoms; moreover, when R$_1$ is methyl, ethyl, propyl, or isopropyl, R$_2$ can be ethyl, propyl, isopropyl, butyl, isobutyl, tert-butyl, 2-ethylhexyl, cyclopentyl, cyclohexyl, methylcyclohexyl, phenyl, or benzyl; when R$_1$ is hydrogen, R$_2$ can be ethyl, butyl, sec.butyl, tert-butyl, 2-ethylhexyl, cyclohexylethyl, diphenylmethyl, p-chlorophenyl, 1-naphthyl, 1-decahydronaphtyl; and R$_1$ and R$_2$ can be equal and be ethyl, propyl, isopropyl, butyl, isobutyl, tert-butyl, neopentyl, phenyl, benzyl, cyclohexyl, cyclopentyl.

4. The process of claim 1, where said phenolic stabilizer is added in quantities ranging from 0.01 to 0.6 g per 100 g of polymer produced in polymerization.

5. Process of claim 1, where said phenolic stabilizer is selected from the group consisting of the compounds of formula (I)

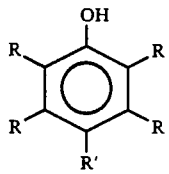

where R' is —CHR$_2$ or —OR; and each R both in formula (I) and in R' can be equal or different, and are selected from the group consisting of hydrogen, or C$_{1-30}$ linear or branched alkyl; C$_{3-30}$ cycloalkyl; C$_{6-30}$ aryl, C$_{7-30}$ alkaryl or aralkyl; or C$_{1-30}$ alcoxyl; one or more of said R optionally containing functional groups; or one or more R and R' being bonded to form cyclic structures, as long as at least one of the two said R radicals in the ortho position with respect to the -OH group in formula (I) is not hydrogen; or from compounds comprising two or more structural units of formula (I) where the R and R' radicals have the meaning described above, except that at least one of R or R' is substituted by a direct bond, or an —O— or —S— functional group, or a radical selected from the group consisting of polyvalent linear or branched C$_{1-30}$ alkyl, C$_{3-30}$ cycloalkyl, C$_{6-30}$ aryl, C$_{7-30}$ aralkyl or alkaryl radical; said polyvalent radicals optionally containing functional groups and where all the valences being saturated by structural units of formula (I).

6. The process of claim 1, where before or during polymerization, one or more stabilizers selected from the group consisting of hindered amine light stabilizers, organic phosphites and phosphonites, and phosphorous organic amides are added.

7. Olefin polymer produced by the process of claim 1 in the form of nonextruded particles, containing one or more phenolic stabilizers and optionally one or more hindered amine light stabilizers, and having an oxidation induction time at 180° C. greater than or equal to 20 minutes.

8. Polymer of claim 7, comprising isotactic propylene homopolymer.

* * * * *

UNITED STATES PATENT AND TRADEMARK OFFICE
CERTIFICATE OF CORRECTION

PATENT NO. : 5,278,210

DATED : January 11, 1994

INVENTOR(S) : Giampiero Morini et al

It is certified that error appears in the above-identified patent and that said Letters Patent is hereby corrected as shown below:

At col. 5, line 31, change "1 8 Kg" to --1.8 Kg--.

At col. 9, line 25, change the "R" on the carbon in the ortho position left of the nitrogen to --$R_1$--.

At col. 15, line 18, insert --component-- after "catalyst".

Signed and Sealed this

Twenty-fourth Day of May, 1994

Attest:

BRUCE LEHMAN

Attesting Officer

Commissioner of Patents and Trademarks